United States Patent
Otsuka et al.

(10) Patent No.: US 11,981,809 B2
(45) Date of Patent: May 14, 2024

(54) STRETCHED BODY, PET BOTTLE, AND METHOD FOR PRODUCING CONTAINER

(71) Applicant: Mitsubishi Gas Chemical Company, Inc., Tokyo (JP)

(72) Inventors: Kosuke Otsuka, Hiratsuka (JP); Takafumi Oda, Hiratsuka (JP)

(73) Assignee: Mitsubishi Gas Chemical Company, Inc., Tokyo (JP)

(*) Notice: Subject to any disclaimer, the term of this patent is extended or adjusted under 35 U.S.C. 154(b) by 405 days.

(21) Appl. No.: 17/277,692

(22) PCT Filed: Sep. 18, 2019

(86) PCT No.: PCT/JP2019/036549
§ 371 (c)(1),
(2) Date: Mar. 18, 2021

(87) PCT Pub. No.: WO2020/059749
PCT Pub. Date: Mar. 26, 2020

(65) Prior Publication Data
US 2021/0347984 A1 Nov. 11, 2021

(30) Foreign Application Priority Data
Sep. 21, 2018 (JP) .................................. 2018-177575

(51) Int. Cl.
*C08L 67/02* (2006.01)
*B29C 49/00* (2006.01)
(Continued)

(52) U.S. Cl.
CPC .......... *C08L 67/02* (2013.01); *B29C 49/0005* (2013.01); *B65D 1/0207* (2013.01);
(Continued)

(58) Field of Classification Search
CPC .. C08L 67/02; C08L 2203/10; C08L 2310/00; C08L 77/06; B29C 49/0005;
(Continued)

(56) References Cited

U.S. PATENT DOCUMENTS

| 6,319,575 B1 | 11/2001 | Takashima et al. |
| 2015/0225541 A1 | 8/2015 | Oda et al. |
| 2016/0176566 A1* | 6/2016 | Hanan .................. B29C 49/071 215/44 |

FOREIGN PATENT DOCUMENTS

| CN | 104520381 A | 4/2015 |
| EP | 3854855 A1 | 7/2021 |

(Continued)

OTHER PUBLICATIONS

Machine Translation of JP 2000290500 (Year: 2000).*
(Continued)

*Primary Examiner* — James C Yager
(74) *Attorney, Agent, or Firm* — Fitch, Even, Tabin & Flannery LLP (57) ABSTRACT

Provided is a stretched body having a high barrier property under high humidity, a PET bottle, and a method for producing a container. The stretched body of a composition containing a semi-aromatic polyamide resin and plate-shaped talc having an aspect ratio of more than 18, a content of the plate-shaped talc having an aspect ratio of more than 18 in the composition is from 3.0 to 55.0 mass % when a total content of the semi-aromatic polyamide resin and the plate-shaped talc having an aspect ratio of more than 18 is 100 mass %.

12 Claims, 1 Drawing Sheet

(51) Int. Cl.
  *B65D 1/02* (2006.01)
  *C08G 69/28* (2006.01)
  *C08J 3/22* (2006.01)
  *C08K 3/34* (2006.01)
  *C08K 7/00* (2006.01)
  *B29K 77/00* (2006.01)
  *B29K 509/02* (2006.01)
  *B29L 31/00* (2006.01)

(52) U.S. Cl.
  CPC .............. *C08G 69/28* (2013.01); *C08J 3/226* (2013.01); *C08K 3/34* (2013.01); *C08K 7/00* (2013.01); *B29K 2077/00* (2013.01); *B29K 2509/02* (2013.01); *B29L 2031/7158* (2013.01); *C08K 2003/343* (2013.01); *C08K 2201/016* (2013.01); *C08L 2203/10* (2013.01); *C08L 2310/00* (2013.01)

(58) Field of Classification Search
  CPC ... B29C 2049/023; B29C 55/14; B29C 55/16; B29C 55/005; B29C 48/0018; B29C 48/08; B29C 49/08; B29C 49/06; B65D 1/0207; B65D 1/02; C08G 69/28; C08J 3/226; C08K 3/34; C08K 7/00; C08K 2003/343; C08K 2201/016; B29K 2067/003; B29K 2995/0051; B29K 2995/0053; B29K 2077/00; B29K 2509/02; B29L 2031/7158
  See application file for complete search history.

(56) References Cited

FOREIGN PATENT DOCUMENTS

| | | |
|---|---|---|
| GB | 2313378 A | 11/1997 |
| JP | S58-160344 A | 9/1983 |
| JP | 2000-290500 A | 10/2000 |
| JP | 2000-302952 A | 10/2000 |
| JP | 2001-347564 A | 12/2001 |
| JP | 2002-036448 A | 2/2002 |
| JP | 2002-161212 A | 6/2002 |
| JP | 2003-342456 A | 12/2003 |
| JP | 2005-067637 A | 3/2005 |
| JP | 2006-057030 A | 3/2006 |
| JP | 2010-070580 A | 4/2010 |
| JP | 2016-198912 A | 12/2016 |
| JP | 2018-145291 A | 9/2018 |
| WO | 97/44384 A1 | 11/1997 |

OTHER PUBLICATIONS

CNIPA; Application No. 201980061331.7 Office Action dated Nov. 15, 2022, 6 pages.
Extended European Search Report issued in corresponding European Application No. 19863102.0 dated Oct. 15, 2021 (8 pages).
International Preliminary Report on Patentability and Written Opinion for PCT/JP2019/036549, dated Dec. 10, 2019, and English Translation submitted herewith (13 pages).
International Search Report for PCT/JP2019/036549, dated Dec. 10, 2019, and English Translation submitted herewith (5 pages).
JPO; Application No. 2020-548550 Office Action dated Apr. 18, 2023, 4 pages.

\* cited by examiner

STRETCHED BODY, PET BOTTLE, AND METHOD FOR PRODUCING CONTAINER

CROSS-REFERENCE TO RELATED APPLICATIONS

This application is a U.S. national phase application filed under 35 U.S.C. § 371 of International Application Number PCT/JP2019/036549, filed Sep. 18, 2019, designating the United States, which claims priority from Japanese Application Number 2018-177575, filed Sep. 21, 2018.

FIELD OF THE INVENTION

The present invention relates to a stretched body, a PET bottle, and a method for producing a container.

BACKGROUND OF THE INVENTION

In the related art, it has been studied to add talc to a thermoplastic resin. For example, Patent Document 1 discloses a polyamide resin composition including from 0.2 to 40 parts by mass of talc relative to 100 parts by mass of polyamide resin, the talc being composed of (a) untreated talc and (b) treated talc in a blending ratio (mass ratio) of (a) to (b) of $0.02 \leq (b)/(a) \leq 50$.

On the other hand, it is also studied to add an inorganic filler to a barrier resin. For example, Patent Document 2 discloses a multilayer structure formed by stretching a multilayer structure twice or longer at least in the uniaxial direction, the multilayer structure being a laminate consisting of a layer including a resin composition (C) containing 100 parts by mass of a barrier resin (A), from 1 to 25 parts by mass of an inorganic filler (B) having a weight average aspect ratio of 5 or more, and/or from 0.5 to 10 parts by mass of a deodorant (F) having a particle size of 0.5 to 10 μm, and a layer including a resin composition (E) containing from 1 to 25 parts by mass of an inorganic filler (B) having a weight average aspect ratio of 5 or more and/or from 0.5 to 10 parts by mass of a deodorant (F) having a particle size from 0.5 to 10 μm with respect to a thermoplastic resin (D) other than the resin (A).

CITATION LIST

Patent Documents

Patent Document 1: JP 2010-070580 A
Patent Document 2: JP 2002-036448 A

SUMMARY OF INVENTION

As described above, various compositions containing a thermoplastic resin and an inorganic filler have been studied. Further, various performances are expected to be exhibited depending on the characteristics and physical properties of the thermoplastic resin and the inorganic filler, and further development is desired.

Based on this situation, an object of the present invention is to provide a stretched body having an excellent oxygen barrier property under high humidity as a novel resin material, a PET bottle, and a method for producing a container.

As a result of the study by the present inventor based on the above problems, they have found that the above-mentioned problems can be solved by blending plate-shaped talc with a large aspect ratio with an aromatic polyamide resin and stretching the mixture. Specifically, the problems described above are solved by the following means <1>, and preferably by the following means <2> to <17>.

<1> A stretched body of a composition including a semi-aromatic polyamide resin and plate-shaped talc having an aspect ratio of more than 18, a content of the plate-shaped talc having an aspect ratio of more than 18 in the composition being from 3.0 to 55.0 mass % when a total content of the semi-aromatic polyamide resin and the plate-shaped talc having an aspect ratio of more than 18 is 100 mass %.

<2> The stretched body according to <1>, in which the semi-aromatic polyamide resin is comprises a diamine-derived structural unit and a dicarboxylic acid-derived structural unit, and 50 mol % or more of the diamine-derived structural units are a xylylenediamine-based polyamide resin derived from xylylenediamine.

<3> The stretched body according to <1> or <2>, in which the content of the plate-shaped talc having an aspect ratio of more than 18 in the composition is from 3.0 to 15.0 mass % when the total content of the semi-aromatic polyamide resin and the plate-shaped talc having an aspect ratio of more than 18 is 100 mass %.

<4> The stretched body according to any one of <1> to <3>, in which the composition further includes a thermoplastic resin other than the semi-aromatic polyamide resin.

<5> The stretched body according to <4>, in which the other thermoplastic resin is at least one selected from a polyester resin, a polyolefin resin, a modified polyolefin resin, and an aliphatic polyamide resin.

<6> The stretched body according to any one of <1> to <5>, in which a content of the semi-aromatic polyamide resin in the composition is from 70 to 96 mass %.

<7> The stretched body according to <5>, in which the content of the polyester resin in the composition is from 70 to 96 mass %.

<8> The stretched body according to any one of <1> to <7>, which is a container.

<9> The stretched body according to any one of <1> to <8>, which is a blow molded article.

<10> A PET bottle including a polyethylene terephthalate resin layer including from 70 to 96 mass % of a polyethylene terephthalate resin,
the polyethylene terephthalate resin layer being formed of a composition including a polyethylene terephthalate resin, a semi-aromatic polyamide resin, and plate-shaped talc having an aspect ratio of more than 18,
a content of the plate-shaped talc having an aspect ratio of more than 18 in the composition being from 3.0 to 55.0 mass % when a total content of the semi-aromatic polyamide resin and the plate-shaped talc having an aspect ratio of more than 18 is 100 mass %.

<11> The PET bottle according to <10>, which is a blow molded article.

<12> A method for producing a container, including:
blow molding a composition including a semi-aromatic polyamide resin and plate-shaped talc having an aspect ratio of more than 18, a content of the plate-shaped talc having an aspect ratio of more than 18 in the composition being from 3.0 to 55.0 mass % when a total content of the semi-aromatic polyamide resin and the plate-shaped talc having an aspect ratio of more than 18 is 100 mass %.

<13> The method for producing a container according to <12>, in which the semi-aromatic polyamide resin comprises a diamine-derived structural unit and a dicarboxylic acid-derived structural unit, and 50 mol % or more of the diamine-derived structural units are a xylylenediamine-based polyamide resin derived from xylylenediamine.

<14> The method for producing a container according to <12> or <13>, in which the content of the plate-shaped talc having an aspect ratio of more than 18 in the composition is from 3.0 to 15.0 mass % when the total content of the semi-aromatic polyamide resin and the plate-shaped talc having an aspect ratio of more than 18 is 100 mass %.

<15> The method for producing a container according to any one of <12> to <14>, in which the composition further includes a thermoplastic resin other than the semi-aromatic polyamide resin.

<16> The method for producing a container according to <15>, in which the other thermoplastic resin is at least one selected from a polyester resin, a polyolefin resin, a modified polyolefin resin, and an aliphatic polyamide resin.

<17> The method for producing a container according to <16>, in which a content of the polyester resin in the composition is from 70 to 96 mass %.

According to the present invention, it is possible to provide a stretched body having an excellent oxygen barrier property under high humidity as a novel resin material, a PET bottle, and a method for producing a container.

DESCRIPTION OF EMBODIMENTS

The contents of the present invention will be described in detail below. Note that in the present specification, "from . . . to . . . " is used to mean that the given numerical values are included as the lower limit and the upper limit, respectively.

The stretched body of the present invention is a stretched body of a composition containing a semi-aromatic polyamide resin and plate-shaped talc having an aspect ratio of more than 18, a content of the plate-shaped talc having an aspect ratio of more than 18 in the composition being from 3.0 to 55.0 mass % when a total content of the semi-aromatic polyamide resin and the plate-shaped talc having an aspect ratio of more than 18 is 100 mass %.

With such a configuration, high oxygen barrier property under high humidity can be achieved. That is, the oxygen barrier property can be enhanced by blending a predetermined talc and stretching the composition. Further, a stretched body having excellent tensile property can be obtained. In addition, the carbon dioxide barrier property can be improved by using a predetermined talc in combination with an oxidation reaction accelerator.

<Semi-Aromatic Polyamide Resin>

The composition used in the present invention includes a semi-aromatic polyamide resin.

The semi-aromatic polyamide resin refers to a resin comprises a diamine-derived structural unit and a dicarboxylic acid-derived structural unit, in which from 30 to 70 mol % of the total structural units of the diamine-derived structural units and the dicarboxylic acid-derived structural units are structural units containing an aromatic ring, and is preferably a resin in which from 40 to 60 mol % of the total structural units of the diamine-derived structural units and the dicarboxylic acid-derived structural units are structural units containing an aromatic ring. By using such a semi-aromatic polyamide resin, the effect of excellent gas barrier property under high humidity is exhibited. Examples of the semi-aromatic polyamide resin include polyamide 6T, polyamide 9T, and xylylenediamine-based polyamide resin described later.

Note that the semi-aromatic polyamide resin is formed from a diamine-derived structural unit and a dicarboxylic acid-derived structural unit, but it does not completely exclude the structural units other than these, and needless to say, the semi-aromatic polyamide resin may contain structural units derived from lactams such as ε-caprolactam and laurolactam, and aliphatic aminocarboxylic acids such as aminocaproic acid and aminoundecanoic acid. In the present invention, the total of the diamine-derived structural units and the dicarboxylic acid-derived structural units in the semi-aromatic polyamide resin preferably accounts for 90 mol % or more and more preferably 95 mol % or more of all the structural units.

The semi-aromatic polyamide resin includes a diamine-derived structural unit and a dicarboxylic acid-derived structural unit, and it is preferable that 50 mol % or more (more preferably 70 mol % or more, even more preferably 80 mol % or more, and yet even more preferably 90 mol % or more) of the diamine-derived structural units are a xylylenediamine-based polyamide resin derived from xylylenediamine. The xylylenediamine is usually selected from metaxylylenediamine and/or paraxylylenediamine, in which preferably 30 mol % or more, more preferably 50 mol % or more, even more preferably 70 mol % or more, yet even more preferably 80 mol % or more, and yet even more preferably 90 mol % or more is metaxylylenediamine.

Examples of the diamine that can be used as a raw material diamine component of the xylylenediamine-based polyamide resin, other than m-xylylenediamine and p-xylylenediamine, include aliphatic diamines such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethyl-hexamethylenediamine, and 2,4,4-trimethylhexamethylenediamine; alicyclic diamines such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin, and bis(aminomethyl)tricyclodecane; and diamines having an aromatic ring, such as bis(4-aminophenyl)ether, p-phenylenediamine, and bis(aminomethyl)naphthalene. One type thereof can be used, or two or more types can be mixed and used.

The type of the raw material dicarboxylic acid component of the xylylenediamine-based polyamide resin is not particularly specified, but examples thereof include α,ω-linear aliphatic dicarboxylic acids having from 4 to 20 carbon atoms and dicarboxylic acids other than the α,ω-linear aliphatic dicarboxylic acids having from 4 to 20 carbon atoms, which will be described later.

In the first embodiment of the xylylenediamine-based polyamide resin, 70 mol % or more of the diamine-derived structural units are derived from xylylenediamine (preferably metaxylylenediamine), and more than 60 mol % of the dicarboxylic acid-derived structural units are a polyamide resin derived from α,ω-linear aliphatic dicarboxylic acid having from 4 to 20 carbon atoms. In the first embodiment, more preferably 75 mol % or more, even more preferably 80 mol % or more, yet even more preferably 85 mol % or more, yet even more preferably 90 mol % or more of the dicarboxylic acid-derived structural units are derived from α,ω-linear aliphatic dicarboxylic acid having from 4 to 20 carbons.

In the first embodiment, examples of the α,ω-linear aliphatic dicarboxylic acid having from 4 to 20 carbon atoms that is preferably used as the raw material dicarboxylic acid component of the xylylenediamine-based polyamide resin include aliphatic dicarboxylic acids such as succinic acid, glutaric acid, pimelic acid, suberic acid, azelaic acid, adipic acid, sebacic acid, undecanedioic acid, and dodecanedioic acid. These can be used alone or in admixture of two or more, but among these, adipic acid or sebacic acid is more preferable, and adipic acid is even more preferable because the melting point of the polyamide resin is in an appropriate range for molding.

Examples of the dicarboxylic acid component other than the α,ω-linear aliphatic dicarboxylic acid having from 4 to 20 carbon atoms include phthalic acid compounds, such as isophthalic acid, terephthalic acid, and orthophthalic acid; naphthalene dicarboxylic acid isomers, such as 1,2-naphthalene dicarboxylic acid, 1,3-naphthalene dicarboxylic acid, 1,4-naphthalene dicarboxylic acid, 1,5-naphthalene dicarboxylic acid, 1,6-naphthalene dicarboxylic acid, 1,7-naphthalene dicarboxylic acid, 1,8-naphthalene dicarboxylic acid, 2,3-naphthalene dicarboxylic acid, 2,6-naphthalene dicarboxylic acid, and 2,7-naphthalene dicarboxylic acid. One type thereof can be used, or two or more types thereof can be mixed and used.

In the first embodiment of the xylylenediamine-based polyamide resin, when the polyamide resin contains a dicarboxylic acid component other than the α,ω-linear aliphatic dicarboxylic acid having from 4 to 20 carbon atoms, isophthalic acid is preferable. When the xylylenediamine-based polyamide resin of the first embodiment contains isophthalic acid, the content thereof is in the range of more than 0 mol % and less than 40 mol %, preferably from 1 to 30 mol %, more preferably from 1 to 10 mol %, and even more preferably from 2 to 7 mol % of the dicarboxylic acid-derived structural units.

The polyamide resin used in the first embodiment is usually a crystalline resin. A crystalline resin is a resin having a definite melting point.

In the second embodiment of the xylylenediamine-based polyamide resin is a polyamide resin in which 70 mol % or more of the diamine-derived structural units are derived from xylylylenediamine (preferably metaxylylenediamine), from 30 to 60 mol % of the dicarboxylic acid-derived structural units are derived from α,ω-linear aliphatic dicarboxylic acid having from 4 to 20 carbon atoms, and from 70 to 40 mol % of the dicarboxylic acid-derived structural units are derived from isophthalic acid (wherein the total of α,ω-linear aliphatic dicarboxylic acid and isophthalic acid does not exceed 100 mol %). Such a polyamide resin has an excellent oxygen barrier property. The polyamide resin used in the second embodiment is usually an amorphous resin. The amorphous resin is a resin having no definite melting point, and specifically, a resin having a crystal melting enthalpy ΔHm of less than 5 J/g, preferably 3 J/g or less, and more preferably 1 J/g or less.

Of all the dicarboxylic acids constituting the dicarboxylic acid-derived structural unit in the xylylenediamine-based polyamide resin of the second embodiment, the lower limit of the proportion of isophthalic acid is preferably 33 mol % or more, more preferably 35 mol % or more, even more preferably 38 mol % or more, yet even more preferably 40 mol % or more, and may be 41 mol % or more. The upper limit of the proportion of isophthalic acid is preferably 67 mol % or less, more preferably 65 mol % or less, even more preferably 62 mol % or less, yet even more preferably 60 mol % or less, and may be 59 mol % or less. Within such a range, the transparency of the stretched body tends to be improved, which is preferable.

Of all the dicarboxylic acids constituting the dicarboxylic acid-derived structural unit in the xylylenediamine-based polyamide resin of the second embodiment, the lower limit of the proportion of the α,ω-linear aliphatic dicarboxylic acid having from 4 to 20 carbon atoms is preferably 33 mol % or more, more preferably 35 mol % or more, even more preferably 38 mol % or more, yet even more preferably 40 mol % or more, and may be 41 mol % or more. The upper limit of the proportion of the α,ω-linear aliphatic dicarboxylic acid having from 4 to 20 carbons is preferably not more than 67 mol %, more preferably not more than 65 mol %, even more preferably not more than 62 mol %, and yet even more preferably not more than 60 mol %, and may be not more than 59 mol %. Within such a range, oxygen barrier property of the stretched body tends to be further enhanced.

Examples of the α,ω-linear aliphatic dicarboxylic acid having from 4 to 20 carbon atoms that is preferably used as the raw material dicarboxylic acid component of the xylylenediamine-based polyamide resin include aliphatic dicarboxylic acids, such as succinic acid, glutaric acid, pimelic acid, suberic acid, azelaic acid, adipic acid, sebacic acid, undecanedioic acid, and dodecanedioic acid. Among these, one or a mixture of two or more may be used, but adipic acid or sebacic acid is more preferable, and adipic acid is more preferable because the melting point of the polyamide resin is in an appropriate range for molding. Within such a range, the transparency of the stretched body tends to be improved, which is preferable.

In the xylylenediamine-based polyamide resin of the second embodiment, of all the dicarboxylic acids constituting the dicarboxylic acid-derived structural unit, the total proportion of the isophthalic acid and the α,ω-linear aliphatic dicarboxylic acid having from 4 to 20 carbon atoms is preferably 90 mol % or more, more preferably 95 mol % or more, even more preferably 98 mol % or more, and may be 100 mol %.

In the xylylenediamine-based polyamide resin of the second embodiment, examples of dicarboxylic acids other than isophthalic acid and α, ω-linear aliphatic dicarboxylic acid having from 4 to 20 carbon atoms include terephthalic acid, 2,6-naphthalenedicarboxylic acid, and alicyclic dicarboxylic acid having from 6 to 12 carbon atoms. Specific examples of the alicyclic dicarboxylic acid having from 6 to 12 carbon atoms include 1,4-cyclohexanedicarboxylic acid and 1,3-cyclohexanedicarboxylic acid.

Regarding the oxygen barrier property of the semi-aromatic polyamide resin in the present invention, the oxygen transmission coefficient measured according to ASTM D3985 at a relative humidity of 60% and a temperature of 23° C. is preferably 3 cc·mm/(m²·day·atom) or less, more preferably 2 cc·mm/(m²·day·atm) or less, even more preferably 1 cc·mm/(m²·day·atm) or less, yet even more preferably 0.5 cc·mm/(m²·day·atm) or less, yet even more preferably 0.2 cc·mm/(m²·day·atm) or less, and yet even more preferably 0.1 cc·mm/(m²·day·atm) or less. Ideally, the lower limit of the oxygen transmission coefficient at a relative humidity of 60% and a temperature of 23° C. is 0 cc·mm/(m²·day·atom), but may be 0.001 cc·mm/(m²·day·atm) or more, and further, 0.005 cc·mm/(m²·day·atm) or more.

The first embodiment of the composition in the present invention is an embodiment in which the composition contains a semi-aromatic polyamide resin as a main component. In the first embodiment, the content of the semi-aromatic polyamide resin in the composition is preferably 70 mass % or more, preferably 80 mass % or more, preferably 85 mass % or more, more preferably 90 mass % or less, may be 95 mass % or more, further may be 99 mass % or more, and particularly may be 100 mass %.

The second embodiment of the composition in the present invention is an embodiment in which the composition includes other thermoplastic resin in addition to the semi-aromatic polyamide resin. The content of the other thermoplastic resin in the composition is preferably from 70 to 96 mass %, more preferably from 80 to 96 mass %, and even more preferably from 90 to 96 mass %. As described above, by setting the content of the other thermoplastic resin to 70 mass % or more, the semi-aromatic polyamide resin and the predetermined plate-shaped talc act as components for improving the barrier property of the stretched body.

Further, in the second embodiment, the total content of the semi-aromatic polyamide resin and the plate-shaped talc in the composition is preferably from 4 to 30 mass %, and more preferably from 4 to 20 mass %.

The thermoplastic resin other than the semi-aromatic polyamide resin is preferably selected from a polyester resin, a polyolefin resin, a modified polyolefin resin, a polyamide resin, a polycarbonate resin, and an acrylic resin. Among these, the thermoplastic resin other than the semi-aromatic polyamide resin is more preferably at least one selected from a polyester resin, a polyolefin resin, a modified polyolefin resin, and an aliphatic polyamide resin, even more preferably includes a polyester resin, and yet even more preferably includes a polyethylene terephthalate resin.

As the polyamide resin, a polymer having, as a repeating unit, an acid amide obtained by ring-opening polymerization of lactam, polycondensation of aminocarboxylic acid, or polycondensation of diamine and dibasic acid is preferable. Specifically, an aliphatic polyamide resin is preferable, and polyamides 6, 11, 12, 46, 66, 610, and 612 are more preferable.

Examples of the polyolefin resin include polypropylene resins and polyethylene resins.

The second embodiment of the composition in the present invention is, more specifically, an embodiment in which the composition contains from 70 to 96 mass % of a polyester resin. Such compositions are preferably used as bottles, especially PET bottles. The semi-aromatic polyamide resin in the present embodiment is preferably the above-mentioned xylylenediamine-based polyamide resin according to the first embodiment, and more preferably a xylylenediamine-based polyamide resin in which 70 mol % or more (more preferably 90 mol % or more) of the diamine-derived structural units are derived from xylylenediamine (preferably metaxylylenediamine), and 90 mol % or more of the dicarboxylic acid-derived structural units are derived from α,ω-linear aliphatic dicarboxylic acid (preferably adipic acid) having 4 to 20 carbon atoms. By using such a xylylenediamine-based polyamide resin, the composition tends to be excellent in blow moldability.

The composition in the present invention may contain only one type of the semi-aromatic polyamide resin or may contain two or more types thereof. If two or more types are contained, the total amount is preferably in the above range.

The composition in the present invention may contain only one type of the thermoplastic resin other than the semi-aromatic polyamide resin, or may contain two or more types thereof. If two or more types are contained, the total amount is preferably in the above range.

The composition in the present invention preferably contains a resin component in an amount of 45 mass % or more, more preferably 48 mass % or more, and even more preferably 65 mass % or more of the composition. The upper limit of the content of the resin component in the composition is preferably 97 mass % or less, more preferably 95 mass % or less, even more preferably 92 mass % or less, yet even more preferably 90 mass % or less, and yet even more preferably 85 mass % or less.

<Talc>

The composition in the present invention contains plate-shaped talc. The plate-shaped talc is also called flaky talc, scaly talc, flat talc, or stratiform talc.

The plate-shaped talc has an aspect ratio of more than 18. The aspect ratio is preferably 20 or more, more preferably 25 or more, further preferably 30 or more, even more preferably 35 or more, even more preferably 36 or more, and yet even more preferably 38 or more. By setting the aspect ratio to the lower limit or more, the permeating oxygen molecules and carbon dioxide molecules detour talc, and the barrier property is effectively improved. The upper limit of the aspect ratio is not particularly specified, but is preferably 60 or less, more preferably 55 or less, even more preferably 51 or less, and yet even more preferably 46 or less. By setting the aspect ratio to the upper limit or less, the effect of excellent secondary processability of the resin composition is more effectively achieved.

The aspect ratio of the plate-shaped talc is measured by observing the ratio (length/thickness) of the cross section of 50 particles of which cross section can be observed with a scanning electron microscope at a magnification from 2000 to 30,000, and arithmetically averaging the ratio of 5 arbitrary particles.

The particle size (median diameter $D_{50}$) of the plate-shaped talc preferably has a lower limit of 1 μm or more, more preferably 2 μm or more, even more preferably 3 μm or more, and yet even more preferably 4 μm or more. By setting the particle size to the lower limit or more, the dispersibility in the resin composition tends to be excellent. The upper limit of the particle size (median diameter $D_{50}$) of the plate-shaped talc is preferably 20 μm or less, more preferably 18 μm or less, even more preferably 15 μm or less, and yet even more preferably 8 μm or less. By setting the particle size to the upper limit or less, the impact resistance of the composition tends to be excellent.

The particle size of plate-shaped talc (median diameter $D_{50}$) is measured according to ISO13320.

The specific surface area of the plate-shaped talc preferably has a lower limit of 2.0 $m^2/g$ or more, more preferably 4.0 $m^2/g$ or more, even more preferably 6.0 $m^2/g$ or more, and yet even more preferably 7.5 $m^2/g$ or more. By setting the specific surface area to the lower limit or higher, the effect of improving the oxygen gas barrier property by allowing the permeating oxygen molecules and carbon dioxide molecules to detour talc (detour effect) is more effectively achieved. The upper limit of the specific surface area of the plate-shaped talc is preferably 20 $m^2/g$ or less, and preferably 18.0 $m^2/g$ or less, even more preferably 15.0 $m^2/g$ or less, and yet even more preferably 13.0 $m^2/g$ or less. By setting the specific surface area to the upper limit or less, the effect of excellent dispersibility in the resin composition can be more effectively achieved.

The specific surface area of the plate-shaped talc is measured according to JIS Z 8830: 2013.

The plate-shaped talc used in the present invention may or may not be surface-treated. In a case of surface treatment, surface treatment by an organic titanate coupling agent, an organic silane coupling agent, a modified polyolefin obtained by grafting an unsaturated carboxylic acid or an anhydride thereof, a fatty acid, a fatty acid metal salt, a fatty acid ester, or a quaternary ammonium salt is preferable, and surface treatment by an organic silane coupling agent is particularly preferable. By surface treatment, the adhesiveness to the resin component tends to be improved.

Specific examples of the surface treatment agent include saturated and/or unsaturated fatty acids such as lauric acid, stearic acid, behenic acid, montanic acid, and erucic acid; their salts of metal such as magnesium, calcium, lithium, zinc, and sodium salts; ester compounds thereof; maleic acid modified products such as polypropylene maleate, polyethylene maleate, and SEBS maleate; silane-based coupling agents; titanate-based coupling agents or zircoaluminate-based coupling agents.

Especially when the purpose is to improve the adhesiveness, a silane coupling agent is preferable, and specific examples thereof include 3-(2-aminoethyl)aminopropyltrimethoxysilane, γ-glycidoxypropyltrimethoxysilane, β-(3, 4-epoxycyclohexyl)ethyltrimethoxysilane, vinyltriethoxysilane, vinyltriethoxysilane, vinyl-tris(2-methoxyethoxy) silane, γ-methacryloxypropyltrimethoxysilane, γ-aminopropyltrimethoxysilane, N-β-(aminoethyl)-γ-aminopropyldimethoxysilane, γ-mercaptopropyltrimethoxysilane, and γ-chloropropyltrimethoxysilane.

The surface treatment agent is preferably a quaternary ammonium salt, and more preferably a quaternary ammonium salt having at least one alkyl group having 12 or more carbon atoms. Specific examples of quaternary ammonium salts include trimethyl alkyl ammonium salts such as trimethyl dodecyl ammonium salt, trimethyl tetradecyl ammonium salt, trimethyl hexadecyl ammonium salt, trimethyl octadecyl ammonium salt, and trimethyl eicosyl ammonium salt; trimethyl alkenyl ammonium salts such as trimethyl octadecenyl ammonium salt and trimethyl octadecadienyl ammonium salt; triethyl alkyl ammonium salts such as triethyl dodecyl ammonium salt, triethyl tetradecyl ammonium salt, triethyl hexadecyl ammonium salt, and triethyl octadecyl ammonium salt; tributyl alkyl ammonium salts such as tributyl dodecyl ammonium salt, tributyl tetradecyl ammonium salt, tributyl hexadecyl ammonium salt, and tributyl octadecyl ammonium salt; dimethyl dialkyl ammonium salts such as dimethyl didodecyl ammonium salt, dimethyl ditetradecyl ammonium salt, dimethyl dihexadecyl ammonium salt, dimethyl dioctadecyl ammonium salt, and dimethyl ditaroammonium salt; dimethyl dialkenyl ammonium salts such as dimethyl dioctadecenyl ammonium salt and dimethyl dioctadecadienyl ammonium salt; diethyl dialkyl ammonium salts such as diethyl didodecyl ammonium salt, diethyl ditetradecyl ammonium salt, diethyl dihexadecyl ammonium salt, and diethyl dioctadecyl ammonium; dibutyl dialkyl ammonium salts such as dibutyl didodecyl ammonium salt, dibutyl ditetradecyl ammonium salt, dibutyl dihexadecyl ammonium salt, and dibutyl dioctadecyl ammonium salt; methylbenzyl dialkyl ammonium salts such as methylbenzyl dihexadecyl ammonium salt; dibenzyl dialkyl ammonium salts such as dibenzyl dihexadecyl ammonium salt; trialkylmethyl ammonium salts such as tridodecylmethyl ammonium salt, tritetradecylmethyl ammonium salt, and trioctadecylmethyl ammonium salt; trialkylethyl ammonium salts such as tridodecylethyl ammonium salt; trialkylbutyl ammonium salts such as tridodecylbutyl ammonium salt; methyldihydroxyethyl hydrogenated taroammonium salt; co-amino acids such as 4-amino-n-butyric acid, 6-amino-n-caproic acid, 8-aminocaprylic acid, 10-aminodecanoic acid, 12-aminododecanoic acid, 14-aminotetradecanoic acid, 16-aminohexadecanoic acid, and 18-aminooctadecanoic acid. Among these, trimethyl dodecyl ammonium salt, trimethyl tetradecyl ammonium salt, trimethyl hexadecyl ammonium salt, trimethyl octadecyl ammonium salt, dimethyl didodecyl ammonium salt, dimethyl ditetradecyl ammonium salt, dimethyl dihexadecyl ammonium salt, dimethyl dioctadecyl ammonium salt, and dimethylditaroammonium salt are mentioned, and these quaternary ammonium salts can be used alone or as a mixture of multiple types. Further, a quaternary ammonium salt having a glycol group such as polyethylene glycol or propylene glycol may be used.

The amount of the surface treatment agent is preferably 0 mass % or more and 30 mass % or less of the mass of talc, and may be 0 mass %. By setting the amount of the surface treatment agent to 30 mass % or less, deterioration and decomposition of the surface treatment agent due to heat can be effectively suppressed, and as a result, talc aggregation can be effectively suppressed, and the malodor caused by the decomposition products of the surface treatment agent can be suppressed more effectively.

Examples of the surface treatment method include a method of immersing talc powder in a 0.5 to 30 mass % aqueous solution or a water dispersion of the above surface treatment agent, and then heat-treating at 140 to 160° C. for 1 to 2 hours.

Regarding the surface treatment method of talc, the description in JP 2011-073902 A can also be referred to, and this content is incorporated in the present specification. Further, regarding the method of melt-kneading with talc powder, the description of JP 2004-142444 A can also be referred to, and the content thereof is incorporated in the present specification.

The content of plate-shaped talc in the composition is from 3.0 to 55.0 mass % when the total of the semi-aromatic polyamide resin and plate-shaped talc is 100 mass %. The lower limit of the content is preferably 5.0 mass % or more, and may be 8.0 mass %. The upper limit of the content is preferably 35.0 mass % or less, more preferably 25.0 mass % or less, and even more preferably 15.0 mass % or less. By setting the blending amount of talc to 55.0 mass % or less, further to 15.0 mass % or less, the generation of voids during stretching can be effectively suppressed, and the barrier property of the stretched body tends to be further improved.

The composition of the present invention may contain only one type of plate-shaped talc, or may contain two or more types thereof. If two or more types are contained, the total amount is preferably in the above range.

The composition in the present invention may also contain talc other than plate-shaped talc having an aspect ratio of more than 18, or may be substantially free of talc. Here, "substantially free" means that the content of the talc other than plate-shaped talc having an aspect ratio of more than 18 is 5 mass % or less, preferably 3 mass % or less, and more preferably 1 mass % or less of the content of the plate-shaped talc having an aspect ratio of more than 18.

<Other Additives>

In addition to the above, the resin composition of the present invention may contain other components. Examples of the other components include adhesive resins, mold release agents, plasticizers, inorganic fillers other than talc, titanium oxide, antioxidants, hydrolysis resistance improvers, matting agents, UV absorbers, nucleating agents other than talc, plasticizers, dispersants, antistatic agents, anticolorants, antigelling agents, and colorants. For these details, the description in paragraphs [0130] to [0155] of JP 4894982 B can be referred to, and the content thereof are incorporated in the present specification. The total amount of these components is preferably 20 mass % or less, more preferably 10 mass % or less, and further preferably 5 mass % or less of the resin composition.

As one embodiment of the resin composition of the present invention, a constitution that is substantially free of an inorganic filler other than talc can be employed. The term "substantially free" means that the content of the inorganic filler other than talc is 10 mass % or less, preferably 5 mass % or less, more preferably 1 mass % or less, even more preferably 0.1 mass % or less of the content of talc, and yet even more preferably null.

The resin composition of the present invention may further contain, or may be substantially free of, glass fibers. The term "substantially free" means that the content of the glass fibers is 10 mass % or less, preferably 5 mass % or less, more preferably 1 mass % or less, even more preferably 0.1 mass % or less of the talc content, and yet even more preferably null.

The resin composition of the present invention may further contain, or may be substantially free of, a swellable layered silicate. The term "substantially free" means that the content of the swellable layered silicate is 10 mass % or less, preferably 5 mass % or less, more preferably 1 mass % or less, even more preferably 0.1 mass % or less of the talc content, and yet even more preferably null. For the swellable layered silicate, the description in paragraphs [0023] to [0027] of JP 2008-239735 A can be referred to, and the content thereof is incorporated in the present specification.

Further, the resin composition of the present invention may further contain, or may be substantially free of, metal oxide particles containing Al. The term "substantially free" means that the content of the metal oxide particles containing Al is 10 mass % or less, preferably 5 mass % or less, more preferably 1 mass % or less, even more preferably 0.1 mass % or less of the talc content, and yet even more preferably null. Examples of the metal oxide particles containing Al include alumina.

Further, the resin composition of the present invention may and may not contain a higher fatty acid having from 4 to 24 carbon atoms and at least one compound selected from metal salts, esters, and amides thereof. Further, the resin composition of the present invention may or may not contain a hydrotalcite compound. Further, the resin composition of the present invention may or may not contain a deodorant (for example, a deodorant having a particle size from 0.5 to 10 μm). For details of the deodorant, the description in paragraphs [0032] to [0034] of JP 2002-036448 A can be referred to, and the content thereof is incorporated in the present specification.

Only one type of each of these components may be used, or two or more types thereof may be used in combination. When two or more types are contained, the total amount is preferably in the above range.

<<<Oxidation Reaction Accelerator>>>

The composition used in the present invention may contain an oxidation reaction accelerator. By containing the oxidation reaction accelerator, the gas barrier property of the molded article can be further enhanced. In particular, the carbon dioxide barrier property does not usually change even if an oxidation reaction accelerator is blended. However, in the present invention, by using the plate-shaped talc and the oxidation reaction accelerator in combination, it is possible to improve both the carbon dioxide gas barrier property and the oxygen gas barrier property.

The oxidation reaction accelerator may be anyone that has an oxidation reaction promoting effect, but a compound containing a transition metal element is preferable from the viewpoint of promoting the oxidation reaction of the semi-aromatic polyamide resin. The transition metal element is preferably at least one selected from the transition metals of Group VIII of the Periodic Table of the Elements, manganese, copper, and zinc, and, from the viewpoint of effectively exhibiting oxygen absorption capacity, more preferably at least one selected from cobalt, iron, manganese, and nickel, and even more preferably cobalt.

As such an oxidation reaction accelerator, in addition to the above-mentioned simple substance of metal, a low-valent oxide, an inorganic acid salt, an organic acid salt, or a complex salt containing the above-mentioned metal is used. Examples of the inorganic acid salt include halides such as chlorides and bromides, carbonates, sulfates, nitrates, phosphates, and silicates. On the other hand, examples of the organic acid salt include carboxylates, sulfonates, and phosphonates. Further, a transition metal complex with β-diketone, β-keto acid ester or the like may also be used.

In particular, in the present invention, from the viewpoint of satisfactorily exhibiting oxygen absorption capacity, it is preferable to use at least one selected from carboxylate, carbonate, acetylacetonate complex, oxide, and halide containing the above-mentioned metal atom, more preferable at least one selected from octanates, neodecanoates, naphthenates, stearates, acetates, carbonates, and acetylacetonate complexes, and even more preferable cobalt carboxylates such as cobalt octanoate, cobalt naphthenate, cobalt acetate, and cobalt stearate.

The above-mentioned oxidation reaction accelerator functions not only to promote the oxidation reaction of the polyamide resin, but also to act as a catalyst for the oxidation reaction of an organic compound having an unsaturated carbon bond or a compound having a secondary or tertiary hydrogen in the molecule. Therefore, in order to further enhance the oxygen absorption capacity, the composition used in the present invention may contain, in addition to the above-mentioned oxidation reaction accelerator, various compounds such as a polymer or its oligomer of an unsaturated hydrocarbon such as polybutadiene or polyisoprene, a compound having xylylenediamine as a skeleton, or a compound to which a functional group is added to enhance the miscibility between the above-mentioned compound and polyester.

Examples of the oxidation reaction accelerator include the transition metal compounds described in paragraphs [0063] to [0066] of WO2012/090797 and the oxidizing organic compounds described in paragraphs [0067] to [0072], and these contents are incorporated in the present specification.

When the oxidation reaction accelerator contains a transition metal element, the content thereof is preferably from 10 to 1,000 mass ppm, more preferably from 20 to 500 mass ppm, and even more preferably from 40 to 300 mass ppm in terms of the transition metal concentration in the composition used in the present invention, from the viewpoint of promoting the oxidation reaction of the polyamide resin and enhancing the oxygen absorption capacity of the molded article.

The transition metal concentration in the composition used in the present invention can be measured by using known methods such as ICP emission spectroscopic analysis, ICP mass analysis, and fluorescent X-ray analysis.

The oxidation reaction accelerator may be used alone or in combination of two or more types. When two or more types are used in combination, the total amount is preferably in the above-mentioned range.

<Stretched Body>

The stretched body of the present invention refers to a molded article obtained by stretching, and examples thereof include a stretched film obtained by stretching a film-like composition and a blow molded article obtained by blow molding the composition. The molded article may be a final product, but may not be a final product, and may be a part or the like. Therefore, the shape of the stretched body is not particularly defined, and may be, for example, a film or a container. Examples of the container may be a molded container such as a bottle, a cup, a tube, a tray, or Tupperware, or a bag-shaped container such as a pouch, a standing pouch, or a zipper-type storage bag.

Hereinafter, preferred embodiments of the stretched body of the present invention will be described. Of course, the stretched body of the present invention is not limited to these.

<<Stretched Film>>

One embodiment of the stretched body of the present invention is a stretched film.

The stretched film may be a single-layer film composed only of a stretched body of the film formed from the composition of the present invention, or a multilayer film containing a stretched body of a film formed from the composition of the present invention and another film. In the case of a multilayer film, it may be one in which unstretched multilayer films are overlapped and simultaneously stretched, or a single-layer stretched film of the present invention bonded to another stretched film and/or unstretched film. The stretched film of the present invention is preferably used as a single-layer stretched film.

The thickness of the stretched film of the present invention is preferably from 10 to 100 μm, and more preferably from 20 to 80 μm.

The stretched film of the present invention is used as a packaging material or the like. In particular, it is preferably used as a packaging material or the like for shielding the contents. For example, the stretched film of the present invention can be used as at least a part of the packaging material, and the bag-shaped container is a preferable example.

As described above, the packaging material obtained by using the stretched film in the present invention is suitable for storing and preserving various articles. For example, the packaging material can store and preserve various articles such as beverages, seasonings, cereals, liquid and solid products that require aseptic filling or heat sterilization, chemicals, liquid daily necessities, pharmaceuticals, semiconductor integrated circuits, and electronic devices. For details thereof, refer to the descriptions in paragraphs [0032] to [0035] of JP 2011-37199 A, the contents of which are incorporated herein.

Next, an example of a method for producing a stretched film will be described.

Examples of the method for producing a stretched film include a method for producing a stretched film, including stretching a film formed of a composition containing a semi-aromatic polyamide resin and from 3 to 55 mass % of plate-shaped talc having an aspect ratio of more than 18.

Hereinafter, a method for producing a stretched film will be described with reference to FIG. 1. Of course, the present invention is not limited to these.

In the method for producing a stretched film of the present invention, first, a plate-shaped talc is kneaded with a molten semi-aromatic polyamide resin and extruded from a T die 11 onto a casting roll 12. The extrusion temperature at the time of extrusion is not particularly specified as long as the resin component in the composition is melted. Thickness of the melt-extruded film (non-stretched film) formed of the composition depends on the application and the stretching ratio, but as an example, it is preferably twice or more, more preferably three times or more, even more preferably five times or more, yet even more preferably 10 times or more, and yet even more preferably 15 times or more the thickness of the stretched film after stretching. The thickness ratio is preferably 60 times or less, more preferably 40 times or less, even more preferably 30 times or less, and particularly preferably 28 times or less.

In the method for producing a stretched film of the present invention, the film formed from the composition is stretched. In FIG. 1, stretching is performed in a stretching/relaxation zone 13.

The stretching may be performed in only one direction (uniaxial stretching) or in two orthogonal directions (biaxial stretching), and biaxial stretching is preferable. It is preferable to stretch the film formed from the composition in one direction in the machine direction (which may be referred to as "MD") or the transverse direction (which may be referred to as "TD") of the film formed from the composition, more preferably MD, or in two directions of MD and TD. In the case of biaxial stretching, bidirectional stretching may be performed simultaneously or sequentially.

MD stretching may be performed by passing a film formed from the composition between rolls having different peripheral speeds. In this case, the peripheral speed is set to be higher in the portion where the film formed from the composition passes between the rolls later. Stretching may be performed using a tenter. On the other hand, TD stretching may be performed using a tenter. Alternatively, a batch type biaxial stretching machine may be used.

When the film formed from the composition is uniaxially stretched, the stretching ratio is preferably 1.3 times or more, more preferably 1.5 times or more, even more preferably 1.8 times or more, and particularly preferably 2.0 times or more. When the film formed from the composition is biaxially stretched, the stretching ratio is preferably 1.2 times or more in each direction, more preferably 1.4 times or more, even more preferably 1.9 times or more, and particularly preferably 2.2 times or more. The upper limit of each stretching ratio in the case of uniaxial or biaxial stretching is not particularly specified, but it may be, for example, 5 times or less, further 4 times or less, and particularly 3.5 times or less.

The total stretching ratio in the present invention is preferably 1.4 times or more, more preferably 1.9 times or more, even more preferably 2.5 times or more, yet even more preferably 3.0 times or more, yet even more preferably 3.5 times or more, and may be 4.8 times or more. The upper limit of the total stretching ratio is not particularly specified, but may be, for example, 25 times or less, further 16 times or less, and particularly 12 times or less. Here, the total stretching ratio is the ratio of the stretched amount to the film before stretching, and is a value represented by the following equation.

$$\text{Total stretching ratio} = \text{MD stretching ratio} \times \text{TD stretching ratio}$$

Stretching may be performed at room temperature, but is preferably performed under heating conditions. When heating, it is preferable to perform stretching while passing the film formed from the composition through the heating zone. The stretching is preferably performed in the range from the glass transition temperature to the temperature lower than the temperature 300° C. higher than the glass transition temperature of the semi-aromatic polyamide resin, more preferably performed in the range from the glass transition temperature to the temperature lower than the temperature 200° C. higher than the glass transition temperature of the semi-aromatic polyamide resin, even more preferably performed in the range from the glass transition temperature to the temperature lower than the temperature 150° C. higher than the glass transition temperature of the semi-aromatic polyamide resin, and yet even more preferably performed in the range from the glass transition temperature to the temperature lower than the temperature 100° C. higher than the glass transition temperature of the semi-aromatic polyamide resin.

When two or more types of semi-aromatic polyamide resins are contained, the temperature of the semi-aromatic polyamide resin at the time of stretching is preferably set based on the glass transition temperature of the semi-aromatic polyamide resin having the lowest glass transition temperature. Further, even when the semi-aromatic polyamide resin has two or more glass transition temperatures, the temperature is preferably set based on the lowest glass transition temperature.

When the stretched film of the present invention is used as a laminated film including a stretched film and another resin film, it may be stretched simultaneously with the other resin film.

Figure 1:
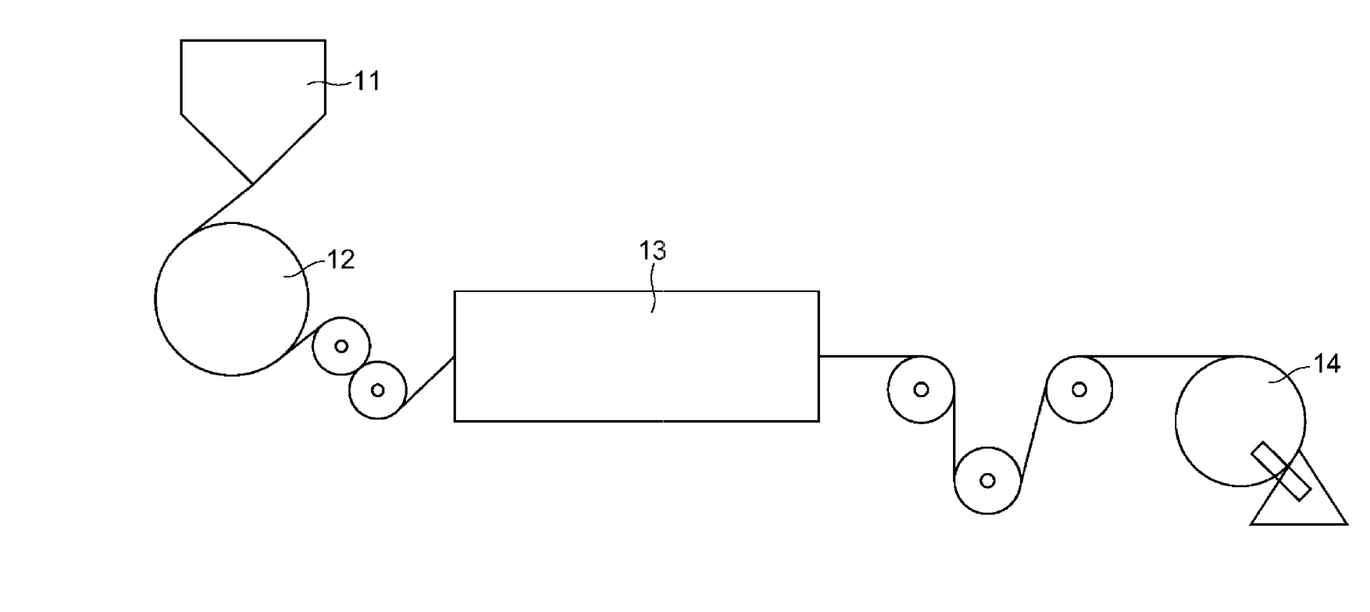
FIG. 1 is a schematic view showing an example of a process for producing a stretched film of the present invention.

In the method for producing a stretched film, it is preferable to perform heat fixation and relaxation after stretching (13 in FIG. 1). The relaxation is preferably carried out during the process of heat fixation. The heat fixation time is preferably from 5 seconds to 5 minutes, and more preferably from 10 seconds to 1 minute. When the relaxation is performed during the heat fixation process, for example, when the heat fixation time is 30 seconds, relaxation may be started from 15 to 16 seconds after the start of heat fixation.

The heat fixation is preferably performed in the range from the glass transition temperature to the temperature lower than the temperature 350° C. higher than the glass transition temperature of the semi-aromatic polyamide resin, more preferably performed in the range from the glass transition temperature to the temperature lower than the temperature 250° C. higher than the glass transition temperature of the semi-aromatic polyamide resin, even more preferably performed in the range from the glass transition temperature to the temperature lower than the temperature 200° C. higher than the glass transition temperature of the semi-aromatic polyamide resin, and yet even more preferably performed in the range from the glass transition temperature to the temperature lower than the temperature 150° C. higher than the glass transition temperature of the semi-aromatic polyamide resin.

The relaxation is preferably performed, for example, by returning the inter-chuck distance in the direction opposite to the stretching direction.

When the film formed from the composition is uniaxially stretched, the relaxation ratio is preferably from 0.5 to 10%, more preferably from 1 to 8%, and even more preferably from 1.5 to 6% in the stretching direction.

When the film formed from the composition is biaxially stretched, the relaxation ratio is preferably from 0.5 to 10%, more preferably from 1 to 8%, and even more preferably from 1.5% to 6% in each stretching direction.

The relaxation ratio is calculated as follows in the case of uniaxial stretching.

$$\text{Relaxation ratio (\%)} = \text{relaxation amount/stretching amount} \times 100$$

In the case of biaxial stretching, the relaxation ratio is calculated as follows.

$$\text{MD relaxation ratio (\%)} = \text{MD relaxation amount/MD stretching amount} \times 100$$

$$\text{TD relaxation ratio (\%)} = \text{TD relaxation amount/TD stretching amount} \times 100$$

The stretched film obtained through the above steps is usually wound on a roll or the like and stored (step 14 in FIG. 1). Further, the stretched film is cut and used for various purposes.

It is preferable to adjust the stretching amount and the relaxation amount so that the final stretching ratio of the stretched film obtained by the production method of the present invention is the above-mentioned stretching ratio.

<<Container>>

A second embodiment of the stretched body of the present invention is a container, more preferably a bottle, and even more preferably a PET bottle. The container may be a single-layer container or a multilayer container. Examples of the stretching method include blow molding performed when molding the container, and biaxial stretching blow molding is more preferable.

In the second embodiment, it is preferable that the preform (sometimes called parison) containing the composition of the present invention is biaxially stretched and blow molded. In particular, it is preferable to include a stretching step using a stretch rod and high-pressure air. Details of biaxial stretching blow molding will be described later.

An example of a bottle embodiment of the present invention is a single-layer container (preferably a bottle). A specific example is a bottle which is a stretched body of a composition containing from 70 to 96 mass % of a polyester resin (preferably polyethylene terephthalate resin), a semi-aromatic polyamide resin, and plate-shaped talc having an aspect ratio of more than 18, the content of the plate-shaped talc having an aspect ratio of more than 18 in the composition being from 3.0 to 55.0 mass % when the total of the semi-aromatic polyamide resin and the plate-shaped talc having an aspect ratio of more than 18 is 100 mass %.

More preferable example is a PET bottle formed from a composition (hereinafter, it may be referred to as "composition X") containing a polyethylene terephthalate resin layer containing from 70 to 96 mass % of a polyethylene terephthalate resin, the polyethylene terephthalate resin layer containing the polyethylene terephthalate resin, a semi-aromatic polyamide resin, and plate-shaped talc having an aspect ratio of more than 18, the content of the plate-shaped talc having an aspect ratio of more than 18 in the composition being from 3.0 to 55.0 mass % when the total of the semi-aromatic polyamide resin and the plate-shaped talc having an aspect ratio of more than 18 is 100 mass %.

The capacity of the single-layer container of the present invention is preferably from 0.1 to 2.0 L, preferably from 0.2 to 1.5 L, and more preferably from 0.3 to 1.0 L from the viewpoint of storage stability of the contents.

The thickness of the barrier layer of the single-layer container, that is, the thickness of the container is preferably 0.005 mm or more, more preferably 0.01 mm or more, even more preferably 0.02 mm or more, and preferably 0.8 mm or less, more preferably 0.5 mm or less, even more preferably 0.4 mm or less, and yet even more preferably 0.3 mm or less.

The second embodiment of the bottle of the present invention is a multilayer container (preferably a bottle). The multilayer container of the present invention is a multilayer container having at least one layer each of a layer containing a polyester resin as the main component (polyester resin layer) and a layer formed from the composition of the present invention (hereinafter, which may be referred to as "barrier layer"). The polyester resin layer and the barrier layer are usually in contact with each other.

The number of layers constituting the multilayer container is preferably at least three layers. In the present invention, an embodiment including at least two polyester resin layers and at least one barrier layer is exemplified. More specifically, the number of layers constituting the multilayer container is more preferably from 3 to 10 layers, and more preferably from 3 to 5 layers.

The number of polyester resin layers in the multilayer container is preferably from 1 to 5 layers, and more preferably 2 to 4 layers. The number of barrier layers in the multilayer container is preferably from 1 to 3 layers, and more preferably 1 layer or 2 layers.

For example, the multilayer container may have a polyester resin layer/barrier layer structure (the polyester resin layer is an inner layer) or a barrier layer/polyester resin layer structure (the barrier layer is an inner layer) including one polyester resin layer and one barrier layer, may have a three-layer structure of a polyester resin layer/barrier layer/polyester resin layer including two polyester resin layers and one barrier layer, and may have a five-layer structure of a polyester resin layer/barrier layer/polyester resin layer/barrier layer/polyester resin layer.

Here, as the composition constituting the barrier layer, the composition described in the first embodiment of the bottle (for example, the composition X) is exemplified. By using the composition described in the first embodiment of the bottle as the barrier layer, the adhesion to the adjacent polyester resin layer is improved, and peeling between layers can be effectively suppressed.

The composition constituting the barrier layer is the composition in the present invention, and examples thereof include a composition containing from 70 to 96 mass % of a semi-aromatic polyamide resin and plate-shaped talc having an aspect ratio of more than 18, the content of plate-shaped talc having an aspect ratio of more than 18 in the composition being from 3.0 to 55.0 mass % when the total of the semi-aromatic polyamide resin and the plate-shaped talc having an aspect ratio of more than 18 is 100 mass %.

In this embodiment, the composition described in the first embodiment of the bottle (for example, the composition X) is particularly preferable.

In addition to the polyester resin layer and the barrier layer, the multilayer container of the present invention may include any layer depending on the desired performance and the like.

The capacity of the multilayer container of the present invention is preferably from 0.1 to 2.0 L, preferably from 0.2 to 1.5 L, and more preferably from 0.3 to 1.0 L from the viewpoint of storage stability of the contents.

The thickness of the barrier layer of the multilayer container is preferably 0.005 mm or more, more preferably 0.01 mm or more, even more preferably 0.02 min or more, and preferably 0.2 mm or less, more preferably 0.15 mm or less, and even more preferably 0.1 mm or less. When two or more barrier layers are provided, it is preferable that the total thickness of the barrier layers is the above thickness.

When two or more barrier layers are provided and an intermediate layer is provided between the barrier layers, the thickness of the intermediate layer is preferably 0.01 mm or more, more preferably 0.03 mm or more, even more preferably 0.05 mm or more, and preferably 2.0 mm or less, more preferably 1.5 mm or less, and even more preferably 1.0 mm or less.

In the multilayer container (particularly the multilayer bottle) of the present invention, the mass of the barrier layer is preferably from 1 to 20 mass %, more preferably from 2 to 15 mass %, and particularly preferably from 3 to 10 mass % relative to the total mass of the container. By setting the mass of the barrier layer within the above range, a multilayer container having good gas barrier properties can be obtained, and molding from parison, which is a precursor of the container, into a multilayer container becomes easy.

The object to be stored in the single-layer or multilayer container of the present invention is not particularly limited, and is suitable for storing and perserving various articles. For example, various articles such as beverages, seasonings, cereals, liquid and solid products that require aseptic filling or heat sterilization, chemicals, liquid daily necessities, pharmaceuticals, semiconductor integrated circuits, and electronic devices can be stored and perserved. For details thereof, refer to the descriptions in paragraphs [0032] to [0035] of JP 2011-37199 A, the contents of which are incorporated herein.

The method for producing a single-layer or multilayer container of the present invention is not particularly specified as long as it includes a stretching step, and a known method can be adopted.

The single-layer or multilayer container of the present invention is preferably produced by biaxially stretching and blow molding the preform. The method for producing a container of the present invention may be cold parison molding or hot parison molding.

Cold parison molding (two-stage molding) is a molding method in which an injection molded preform is cooled to room temperature, stored, reheated by another apparatus, and subjected to blow molding. Hot parison molding (one-stage molding) is a method of blow molding by preheating the parison at the time of injection molding and adjusting the temperature before blowing without completely cooling the parison to room temperature. In hot parison molding, in many cases, an injection molding machine, a temperature control zone, and a blow molding machine are provided in the same molding machine unit, and preform injection molding and blow molding are performed.

In addition, the method for producing a single-layer or multilayer container of the present invention can be referred to in paragraphs 0070 to 0074 of JP 2016-198912 A, paragraphs 0085 to 0119 of JP 2016-169027 A, and JP 60-232952 A, as long as the spirit of the present invention is not deviated, and these contents are incorporated herein by reference.

EXAMPLES

The present invention will be described in more detail below through examples. The following materials, usage amounts, proportions, processing details, processing procedures, and the like described in the examples may be changed, as appropriate, as long as there is no deviation from the spirit of the present invention. Therefore, the scope of the present invention is not limited to the specific examples described below.

Raw Material
<Semi-Aromatic Polyamide Resin>
MXD6: Polymetaxylylene Adipamide
<<Synthesis of MXD6>>

A 50 L jacketed reactor equipped with a stirrer, a partial condenser, a cooler, a thermometer, a dropping tank, and a nitrogen gas introduction tube was charged with 15 kg of adipic acid, 0.4 g of sodium hypophosphate monohydrate, and 0.2 g of sodium acetate, and then sufficiently purged with nitrogen, and heated to 180° C. under a small amount of nitrogen stream to uniformly melt adipic acid, after which 13.9 kg of m-xylylenediamine was added dropwise over 110 minutes under stirring the system. During this time, the internal temperature was continuously increased to 245° C. Note that the water produced by polycondensation was removed from the system through the partial condenser and the cooler. After the completion of dropwise addition of the m-xylylenediamine, the internal temperature was further increased to 260° C., and the reaction was continued for 1 hour, after which a polymer was removed as a strand from a nozzle at the bottom of the reactor, and cooled with water and then pelletized to obtain a pelletized polymer.

Next, the polymer obtained through the above operation was inserted into a 250 L rotary tumbler equipped with a heating jacket, a nitrogen gas introduction tube, and a vacuum line, and the pressure in the system was reduced while rotating the tumbler, after which the pressure was returned to normal pressure using nitrogen of a purity of 99 vol % or more. This operation was performed three times. Subsequently, the temperature inside the system was increased to 140° C. under nitrogen circulation. Next, the pressure inside the system was reduced, the temperature in the system was continuously increased to 200° C. and held for 30 minutes at 200° C., after which nitrogen was introduced to return the system to normal pressure, and then the reaction system was cooled to obtain a polyamide resin (MXD6).

The melting point of the obtained polyamide resin was 237° C., the number average molecular weight was 26000, and the glass transition temperature was 85° C.

<Plate-Shaped Talc>
<Filler (Plate-Shaped Talc or its Substitute)>
PAOG-2: plate-shaped talc, available from Nippon Talc Co., Ltd., high aspect ratio talc series, aspect ratio 45, particle size (median diameter $D_{50}$) 7 μm, specific surface area 8.5 m$^2$/g <Other Resin>
PET resin: 1.5 mol % isophthalic acid copolymer polyethylene terephthalate, BK2180, available from Mitsubishi Chemical Corporation Production of Film (Reference Examples 1 to 3, Examples 1 to 4)

The composition in which plate-shaped talc was blended with the semi-aromatic polyamide resin in the proportions shown in Table 1 was melt-extruded from the die. More specifically, a composition obtained by melt-kneading the components was extruded, and a film having a width of 130 mm was obtained. The obtained film was cut into 90 mm squares (non-stretched film).

Then, using a biaxial stretching device (Tenter method, EX105S, available from Toyo Seiki Seisaku-sho, Ltd.), stretching was performed in the MD and TD directions so as to have the stretching ratios shown in Table 1, then the film was relaxed to a relaxation ratio of 1% while being heat fixed at 210° C., and a stretched film having a thickness of 30 μm is obtained.

<Oxygen Transmission Coefficient (OTC)>
For the films obtained above, the oxygen transmission rate (OTR) in the atmosphere of relative humidity (60% RH, 80% RH, 90% RH) shown in Table 1 was measured at 23° C. using an oxygen transmission coefficient measuring device, according to ASTM D3985. The pressure of the oxygen atmosphere was set to 1 atm, and the measurement time was 24 hours. Note that the oxygen transmission coefficient (OTC) is calculated as follows.

OTC=OTR×Measured Film Thickness (μm)/1000

The oxygen transmission rate (OTR) was measured using an oxygen transmission rate measuring device (product name: "OX-TRAN (trade name) 2/21", available from MOCON Inc.).

Note that 60% RH indicates an atmosphere at a relative humidity of 60% (the same applies to 80% RH and others). The OTC unit is expressed in cc·mm/(m$^2$·day·atm).

The barrier improvement coefficient is the ratio of oxygen transmission coefficient OTC$^{90}$ of the stretched film of the composition at a relative humidity of 90% and a temperature of 23° C. to the oxygen transmission coefficient OTC$^{90'}$ of the unstretched film of a composition obtained by removing plate-shaped talc from the composition (Reference Example 1, semi-aromatic polyamide resin only) measured according to ASTM D3985 a relative humidity of 90% and a temperature of 23° C.). (OTC$^{90'}$/OTC$^{90}$. The same applies to the cases of relative humidities of 60% and 80%.

Tensile Test (Tensile Modulus of Elasticity, Tensile Strength at Break, Tensile Elongation at Break)

The stretched film obtained above was stored for 1 week in an environment of 23° C. and a relative humidity of 50%, and then measured for the modulus of elasticity, breaking strength, and breaking elongation at a test speed of 50 mm/min using a strip having a width of 10 mm according to JIS K 7127. At the time of measurement, tension on the film was performed in the MD direction. The distance between the chucks was set to 50 mm.

<Film Impact>
The film obtained above was stored for 1 week in an environment of 23° C. and 50% relative humidity, and then an impact test was carried out using a film impact tester according to ASTM D781.

As the film impact tester, a model: ITF-60 available from Tosoku Seimitsu Kogyo, Co., Ltd. was used.

TABLE 1

| | | | Reference Example 1 | Reference Example 2 | Reference Example 3 | Example 1 | Example 2 | Example 3 | Example 4 |
|---|---|---|---|---|---|---|---|---|---|
| Semi-aromatic polyamide resin | | | MXD6 | MXD6 | MXD6 | MXD6 | MXD6 | MXD6 | MXD6 |
| Plate-shaped talc | Type | | | | | PAOG-2 | PAOG-2 | PAOG-2 | PAOG-2 |
| | Aspect ratio | | | | | 45 | 45 | 45 | 45 |
| | Particle size (D = 50) | μm | | | | 7 | 7 | 7 | 7 |
| | Added amount | mass % | | | | 10 | 20 | 30 | 10 |
| Stretched film | Stretching ratio | | Unstretched | 4 × 4 | 2 × 2 | 2 × 2 | 2 × 2 | 2 × 2 | 2.5 × 2.5 |
| | Thickness | μm | 30 | 30 | Stretching was performed until a thickness of the film is 30 μm, but stretching unevenness was large. | 30 | 30 | 30 | 30 |
| | OTC (23° C.) 60% RH | cc·mm/m$^2$·day·atm | 0.091 | 0.050 | | 0.028 | 0.029 | 0.026 | 0.025 |
| | 80% RH | cc·mm/m$^2$·day·atm | 0.100 | 0.065 | | 0.047 | 0.038 | 0.036 | 0.045 |
| | 90% RH | cc·mm/m$^2$·day·atm | 0.190 | 0.100 | | 0.083 | 0.059 | 0.056 | 0.080 |

TABLE 1-continued

|  |  | Reference Example 1 | Reference Example 2 | Reference Example 3 | Example 1 | Example 2 | Example 3 | Example 4 |
|---|---|---|---|---|---|---|---|---|
| Barrier improvement coefficient (vs neat/unstretched) | | | | | | | | |
| 60% RH | | 1.0 | 1.8 | | 3.3 | 3.1 | 3.5 | 3.6 |
| 80% RH | | 1.0 | 1.5 | | 2.1 | 2.6 | 2.8 | 2.2 |
| 90% RH | | 1.0 | 1.9 | | 2.3 | 3.2 | 3.4 | 2.4 |
| Tensile test | | | | | | | | |
| MD modulus of elasticity | GPa | 3.0 | 4.5 | | 4.5 | 4.6 | 4.8 | 4.5 |
| MD breaking strength | MPa | 91 | 374 | | 190 | 193 | 130 | 191 |
| MD breaking elongation | % | 4 | 107 | | 92 | 67 | 45 | 91 |
| Film impact | kgf · cm | 0.5 | 15.8 | | 7 2 | 5.0 | 4.9 | 7.0 |

In Table 1 above, the stretching ratio of 4×4 means that the film was stretched to reach 4 times in both MD and TD.

As is clear from the above results, by blending a predetermined plate-shaped talc, a high barrier property under high humidity could be maintained. It was also excellent in tensile properties.

On the other hand, when talc was not blended, the barrier property under high humidity was low regardless of whether stretching was performed or not (Reference Examples 1 to 3). In particular, when talc was not blended and when the film was stretched 2×2 times, uneven stretching occurred and proper stretching could not be performed.

Single-Layer Blend Bottle (Reference Example 10, Examples 10 to 13)

<Production of Blend Bottles>

As shown in Table 2, cobalt (II) stearate in Example 12 were further blended with a semi-aromatic polyamide resin and plate-shaped talc. In Reference Example 10, plate-shaped talc was not blended. In Examples 10 to 13, the blending amount of the semi-aromatic polyamide resin was adjusted so that the total amount of the semi-aromatic polyamide resin, plate-shaped talc, and cobalt (II) stearate (Example 12 only) was 100 mass %, and a barrier material was obtained.

The column of the barrier material (mass %) in Table 2 indicates the amount of the barrier material with respect to the mass of the entire bottle. For example, in the case of Reference Example 10, it is 5 mass %. The column of the added amount of plate-shaped talc is the amount based on the total mass of the semi-aromatic polyamide resin, plate-shaped talc, and, as necessary, cobalt stearate. The amount is, for example, 5 mass % in Example 10.

<Preform Molding>

Using an injection molding machine having one injection cylinder (model SE130EV, available from Sumitomo Heavy Industries, Ltd.) and a two-piece mold, a mixture of PET resin and barrier material shown in Table 2 (for example, in Example 10, a mixture of BK2180 (95 mass %) as a PET resin and the barrier material (5 mass %)) was injected, and a single-layer preform (equivalent to 21 g per preform) was produced under the conditions below. The shape of the preform was 86 mm in total length, 23 mm in outer diameter of the body, and 2.9 mm in thickness.

Injection cylinder temperature: 285° C.
Resin flow path temperature in the mold: 285° C.
Mold cooling water temperature: 15° C.
Cycle time: 30 seconds <Bottle Molding>

The preform obtained above was biaxially stretched and blow molded by a blow molding device (EFB1000ET, available from Frontier Inc.) to obtain a bottle (hollow single-layer container). The internal volume of the bottle is 350 mL. The biaxial stretching blow molding conditions are as shown below.

Heating temperature for preform: 103° C.
Pressure for stretching rod: 0.7 MPa
Primary blow pressure: 0.6 MPa
Secondary blow pressure: 2.5 MPa
Primary blow delay time: 0.45 seconds
Primary blow time: 0.35 seconds
Secondary blow time: 2.0 seconds
Blow exhaust time: 0.6 seconds
Mold temperature: 30° C.

<Oxygen Transmission Rate>

The oxygen barrier property of the container was evaluated by the following method.

An oxygen permeability test by the MOCON method was performed according to ASTM D3985. OX-TRAN2/61 available from MOCON was used for the measurement. The 350 mL bottles obtained in each Example and Comparative Example were filled with 100 mL of water, 1 atm of nitrogen was circulated inside the bottle at 20 mL/min at a temperature of 23° C., a relative humidity of 100% inside the bottle, and a relative humidity of 50% of the external humidity under the condition of an oxygen partial pressure of 0.21 atm, and the oxygen transmission rate was measured by detecting the oxygen contained in the nitrogen after circulation inside the bottle with a coulometric sensor.

<Carbon Dioxide Barrier Property>

The bottle was filled with 350 mL of 4.2 GV carbonated water, the cap was closed, and the bottle was stored for 7 days in an environment of 23° C. and 50% relative humidity. Subsequently, a shelf life of 20% carbon dioxide loss rate of the container at 23° C., 100% relative humidity inside the bottle, and 50% relative humidity outside the bottle was measured using a carbon dioxide transmission rate measuring apparatus. A longer shelf-life measured indicates a better carbon dioxide barrier property.

A "PERMATRAN-C Model 10" (trade name) available from MOCON was used as the carbon dioxide transmission rate measuring apparatus.

TABLE 2

| | | | Reference Example 10 | Example 10 | Example 11 | Example 12 | Example 13 |
|---|---|---|---|---|---|---|---|
| PET resin | | | BK2180 | BK2180 | BK2180 | BK2180 | BK2180 |
| Barrier material | | mass % | 5 | 5 | 5 | 5 | 5 |
| Barrier material (composition) | | | | | | | |
| Semi-aromatic polyamide resin | | | MXD6 | MXD6 | MXD6 | MXD6 | MXD6 |
| Type of plate-shaped talc | | | | PAOG-2 | PAOG-2 | PAOG-2 | PAOG-2 |
| Added amount of plate-shaped talc | | mass % | | 5 | 10 | 10 | 20 |
| Cobalt (II) stearate | | mass % | | | | 0.1 | |
| Oxygen transmission rate | 23° C., 100% RH/50% RH | cc/bottle · day · 0.21 atm | 0.020 | 0.018 | 0.017 | <0.001 | 0.020 |
| Carbon dioxide barrier property | 23° C., 100% RH/50% RH | day (20% loss) | 100 | 111 | 135 | 135 | 105 |

As is clear from the above results, the stretched body of the present invention was able to maintain a high oxygen barrier property under high humidity in the form of a bottle. The stretched body of the present invention also had excellent carbon dioxide barrier property.

The invention claimed is:

1. A stretched body of a composition comprising a semi-aromatic polyamide resin and plate-shaped talc having an aspect ratio of more than 18, a content of the plate-shaped talc having an aspect ratio of more than 18 in the composition being from 10.0 to 55.0 mass % when the total content of the semi-aromatic polyamide resin and the plate-shaped talc having an aspect ratio of more than 18 is 100 mass %.

2. The stretched body according to claim 1, wherein the semi-aromatic polyamide resin comprises diamine-derived structural units and a dicarboxylic acid-derived structural unit, and 50 mol % or more of the diamine-derived structural units are a xylylenediamine-based polyamide resin derived from xylylenediamine.

3. The stretched body according to claim 1, wherein the content of the plate-shaped talc having an aspect ratio of more than 18 in the composition is from 10.0 to 15.0 mass % when the total content of the semi-aromatic polyamide resin and the plate-shaped talc having an aspect ratio of more than 18 is 100 mass %.

4. The stretched body according to claim 1, wherein the composition further comprises a thermoplastic resin other than the semi-aromatic polyamide resin.

5. The stretched body according to claim 4, wherein the other thermoplastic resin is at least one selected from a polyester resin, a polyolefin resin, a modified polyolefin resin, and an aliphatic polyamide resin.

6. The stretched body according to claim 1, wherein a content of the semi-aromatic polyamide resin in the composition is from 70 to 90 mass %.

7. The stretched body according to claim 5, wherein the content of the polyester resin in the composition is from 70 to 96 mass %.

8. The stretched body according to claim 1, which is a container.

9. The stretched body according to claim 1, which is a blow molded article.

10. The stretched body according to claim 2, wherein the content of the plate-shaped talc having an aspect ratio of more than 18 in the composition is from 10.0 to 15.0 mass % when the total content of the semi-aromatic polyamide resin and the plate-shaped talc having an aspect ratio of more than 18 is 100 mass %.

11. The stretched body according to claim 2, wherein the composition further comprises a thermoplastic resin other than the semi-aromatic polyamide resin.

12. The stretched body according to claim 2, wherein a content of the semi-aromatic polyamide resin in the composition is from 70 to 90 mass %.

* * * * *